(12) United States Patent
Ritter et al.

(10) Patent No.: US 6,688,822 B2
(45) Date of Patent: Feb. 10, 2004

(54) PLASTIC INJECTION ANCHORING SLEEVE

(75) Inventors: Frank Georg Ritter, Schwabmünchen (DE); Gerald Brendel, Untermeitingen (DE)

(73) Assignee: Ritter GmbH, Schwabmünchen (DE)

( * ) Notice: Subject to any disclaimer, the term of this patent is extended or adjusted under 35 U.S.C. 154(b) by 0 days.

(21) Appl. No.: 10/235,046

(22) Filed: Sep. 4, 2002

(65) Prior Publication Data

US 2003/0049093 A1 Mar. 13, 2003

(30) Foreign Application Priority Data

Sep. 7, 2001 (DE) .......................... 101 43 866

(51) Int. Cl.$^7$ .......................... F16B 13/04; F16B 39/02
(52) U.S. Cl. .......................... 411/21; 411/33; 411/60.1; 411/82.3
(58) Field of Search .............. 411/21, 32, 33, 411/60.1, 60.2, 82, 82.1, 82.3

(56) References Cited

U.S. PATENT DOCUMENTS

| 3,269,251 A | 8/1966 | Bass et al. | |
|---|---|---|---|
| 4,712,957 A | * 12/1987 | Edwards et al. | 411/82.1 |
| 5,536,122 A | * 7/1996 | Weber | 411/33 |
| 5,704,752 A | * 1/1998 | Logerot | 411/21 X |

FOREIGN PATENT DOCUMENTS

| DE | 32 27 854 | 1/1984 |
|---|---|---|
| DE | 37 05 676 | 10/1997 |
| EP | 0 109 026 | 5/1984 |
| EP | 0 287 505 | 10/1988 |

\* cited by examiner

*Primary Examiner*—Neil Wilson
(74) *Attorney, Agent, or Firm*—Klaus J. Bach

(57) ABSTRACT

In a plastic injection anchoring sleeve having an essentially cylindrical sleeve body with a closed front end and an open opposite end for the insertion of an anchoring bolt, the sleeve wall has a plurality of openings closed by flaps which are formed integrally with the sleeve and pivotally supported thereby at their front ends, the flaps being provided with axially extending ribs projecting radially inwardly and having inclined front and rear end portions forming ramps for lifting the flaps outwardly and out of the openings when the sleeve body is removed axially from a molding core after injection molding, or when an anchor bolt is inserted into the sleeve body.

4 Claims, 5 Drawing Sheets

PLASTIC INJECTION ANCHORING SLEEVE

BACKGROUND OF THE INVENTION

The invention relates to an injection anchoring sleeve of plastic.

Injection anchors are used for anchoring components or articles to wails of hollow blocks or concrete or other masonry walls, wherein it is important to obtain a good connection which is not only based on friction, but which provides for locking or self-substance retention.

To this end, injection anchors comprise an injection anchoring sleeve, which is known in various forms, injection mortar which, after insertion of the injection sleeve, is introduced into the sleeve opening and an anchoring bolt which is then inserted into the anchoring sleeve and which has a profiled, that is generally threaded, outer surface by way of which it is engaged with the mortar and/or the sleeve.

In order to facilitate a positive locking in hollow blocks, or respectively, a substance retention of the injection mortar in the bore hole wall, various kinds of injection anchoring sleeves have been proposed and are in use. A common embodiment of such injection anchoring sleeve is the so-called sieve sleeve wherein the sleeve wall consists of a sieve-like lattice structure.

Such sieve sleeves of metal or a metal wire lattice structure or, respectively, plastic sleeves reinforced with a metal wire lattice structure however are expensive and complicated to manufacture. Sieve sleeves which consist only of plastic can be manufactured by injection molding techniques and are therefore substantially less expensive to manufacture. They permit furthermore design variations, for example, outwardly projecting elastic flaps may be provided, but they have the disadvantage that they are not permitted for many applications by construction regulations because such sieve sleeves may not provide for the required pull-out resistance values and such sieve sleeves of plastic will not comply with the friction locking requirements.

With regard to form-locking anchoring of the sleeves in hollow block walls, conventional sieve sleeves of plastic and also of metal or of plastic-metal compound structures have the disadvantage that the flow of the injection mortar through the sieve openings of the sleeve into the openings of the wall blocks is not reliably controllable so that it is not known whether the mortar passing outwardly through the sieve comes into firm contact with drilled-through wall material or whether it is discharged somewhere else into a chamber of a hollow block.

Another known injection anchoring sleeve includes an elastic stocking disposed on a plastic support structure. In this arrangement, the injection mortar does not flow through the stocking but expands it radially in the area of the block chambers and provides therefore for a quite reliable form-fitting locking of the anchoring sleeve. However, because the injection mortar will not adhere to the bore walls, this type of anchors are not suitable for anchoring injection anchoring sleeves in concrete walls. It also does not provide for a safe friction locking in the bore drilled into the concrete wall.

It is the object of the present invention to provide an injection anchoring sleeve of plastic, which cannot only be manufactured in a simple and inexpensive manner by injection molding but which also has excellent anchoring properties for locking the anchoring sleeve in concrete, in hollow block walls and other masonry walls, for locking in a form-fitting manner and also by substance retention and frictional engagement of the anchoring sleeve.

SUMMARY OF THE INVENTION

In a plastic injection anchoring sleeve having an essentially cylindrical sleeve body with a closed front end and an open opposite end for the insertion of an anchoring bolt, the sleeve wall has a plurality of openings closed by flaps which are formed integrally with the sleeve and pivotally supported thereby at their front ends, the flaps being provided with axially extending ribs projecting radially inwardly and having inclined front and rear end portions forming ramps for lifting the flaps outwardly out of the openings when the sleeve body is removed axially from a molding core after injection molding or when an anchor bolt is inserted into the sleeve body.

The arrangement according to the invention provides for the following advantageous results:

The injection anchoring sleeve according to the invention can be manufactured by injection molding in a single piece wherein the radially inwardly projecting ribs of the flaps are formed by corresponding radial recesses in the essentially cylindrical mold core forming the hollow interior of the anchoring sleeve. When the injection molding step is completed the finished anchoring sleeve is pushed axially from the cylindrical mold core wherein, because of the slopes of the ribs, the flaps are pivoted about their front joints with the sleeve radially outwardly. As a result, the ribs are lifted out of the radial recesses of the cylindrical mold core and the anchoring sleeve can be pushed off the mold core without any problems. At the same time, it is ensured in this way that the flaps will not remain firmly attached to the sleeve walls, but can be pivoted outwardly into their operational positions where they act as barbs when the anchoring sleeve is later inserted into an anchoring bore.

Upon installation of the anchoring sleeve into an anchoring bore, the flaps are again pivoted inwardly. Where there are openings in the masonry that is in areas of open chambers in a hollow block, the flaps will again pivot outwardly somewhat. They are pressed outwardly when the injection mortar is introduced under pressure into the auxiliary sleeves. Since the flaps are attached at their front ends to the anchoring sleeve body whereby they are pivotally supported (the thin wall connection acts as an elastic joint) the radially outwardly pivoted flaps extend backwardly at an angled orientation (with regard to the insertion direction) and, in this way form a rearwardly directed discharge opening for the injection mortar. In this way, the injection mortar flows backwardly from the anchoring sleeve in form-locking abutment with the hollow chamber walls of the hollow blocks.

Flaps, which are not, or not fully, opened are opened at the latest when the anchor bolts are inserted into the anchoring sleeves. The front ends of the anchor bolts cooperates with the inclined rear rib portions so that the flaps are forced outwardly by the anchor bolts during insertion of the anchor bolts into the anchoring sleeves. Where the flaps cannot yield outwardly because they are disposed in solid wall areas of the masonry wall, that is, where they are engaged by the walls of the bores in the hollow blocks, the respective ribs are compressed by the anchoring bolt, which is pressed hammered or screwed into the anchoring sleeve. The compression of the ribs provides for radial clamping between the anchor bolt and the bore wall so that, in these areas, a firm friction fit is provided. In this way, the additional advantage is achieved that the anchor bolt is centered in the anchoring sleeve according to the invention by the ribs extending inwardly from the flaps essentially over the full length of the anchoring sleeve, which is generally not the case with conventional injection anchors. With injection anchors, a certain clearance has to remain between the inner anchoring sleeve surface and the anchor bolt for receiving the injection mortar since otherwise an engagement between the injection mortar and the anchoring bolt is not possible. The injection anchoring sleeve according to the invention fulfills all the criteria of the object of the invention.

Below, an embodiment of the invention will be described in greater detail with reference to the accompanying drawings.

DESCRIPTION OF A PREFERRED EMBODIMENT

Figure 1:
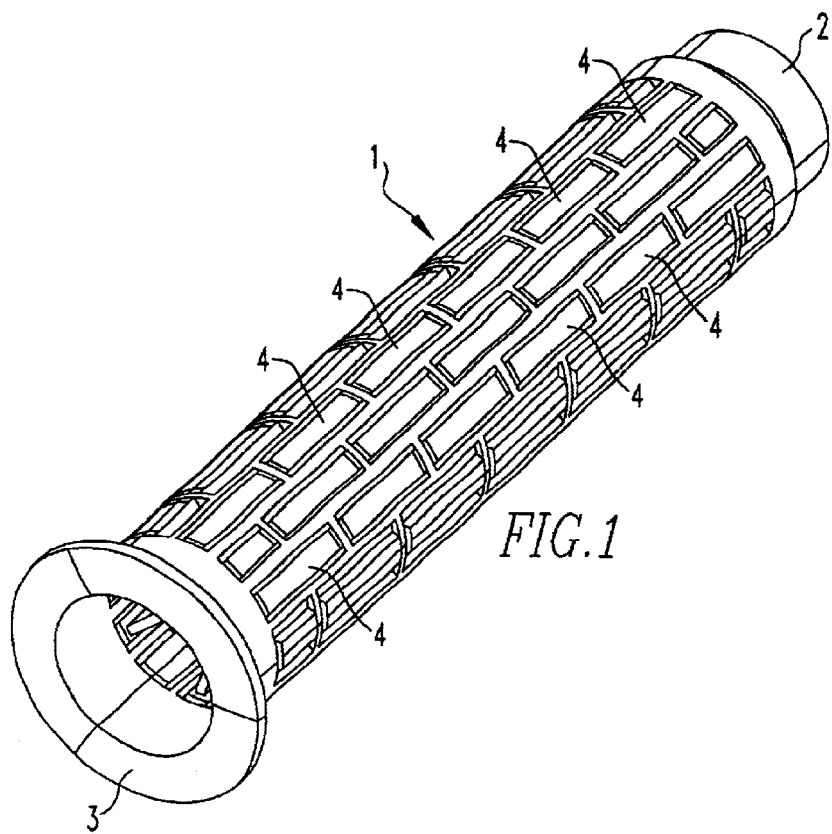
FIG. 1 is a perspective view of an injection anchoring sleeve according to the invention.
Figure 2:
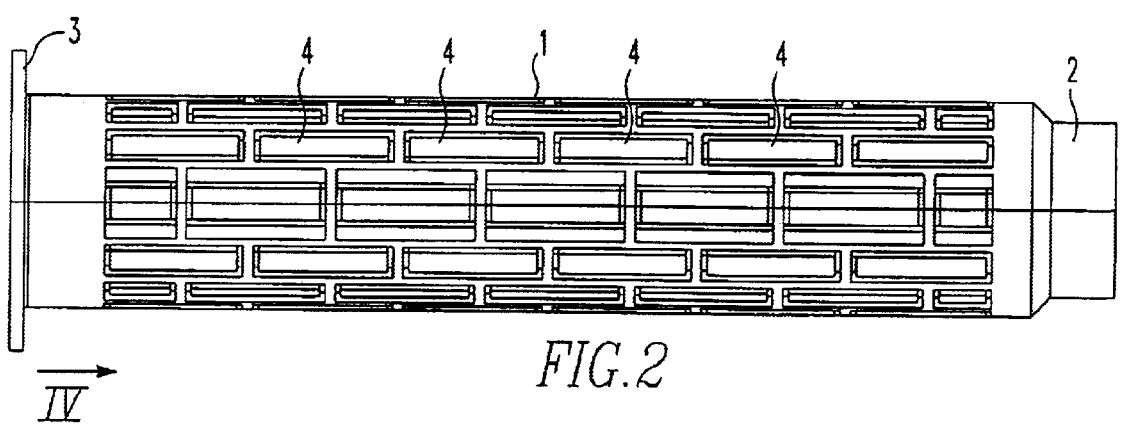
FIG. 2 is a side view of the anchoring sleeve shown in FIG. 1.
Figure 3:
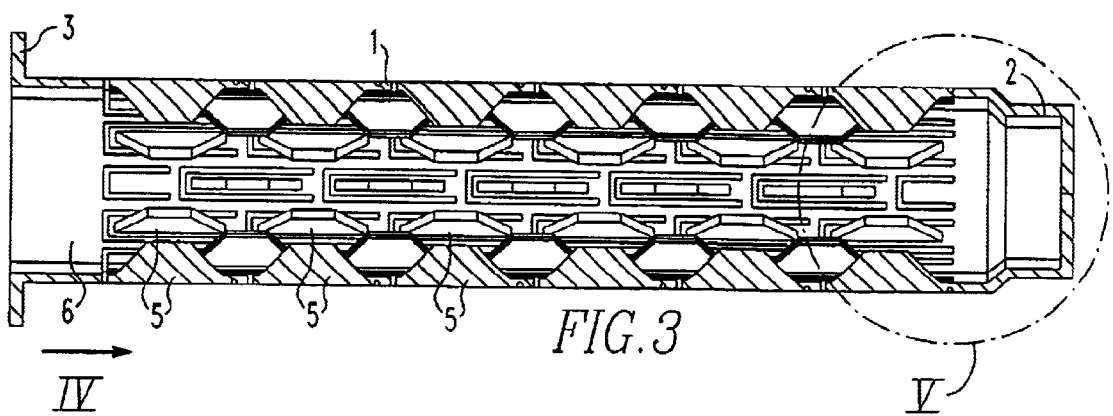
FIG. 3 is an axial cross-sectional view of the anchoring sleeve as shown in FIGS. 1 and 2.
Figure 4:
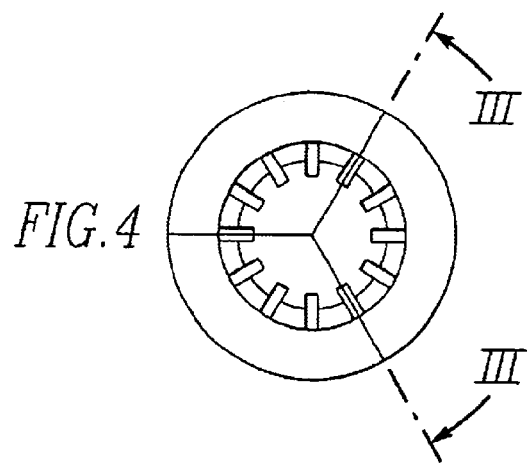
FIG. 4 is an end view of the anchoring sleeve as seen in the direction of the arrow IV in FIGS. 2 and 3, wherein, in FIG. 4, the section planes of the axial cross-section of FIG. 3 are indicated by the line III—III.
Figure 5:
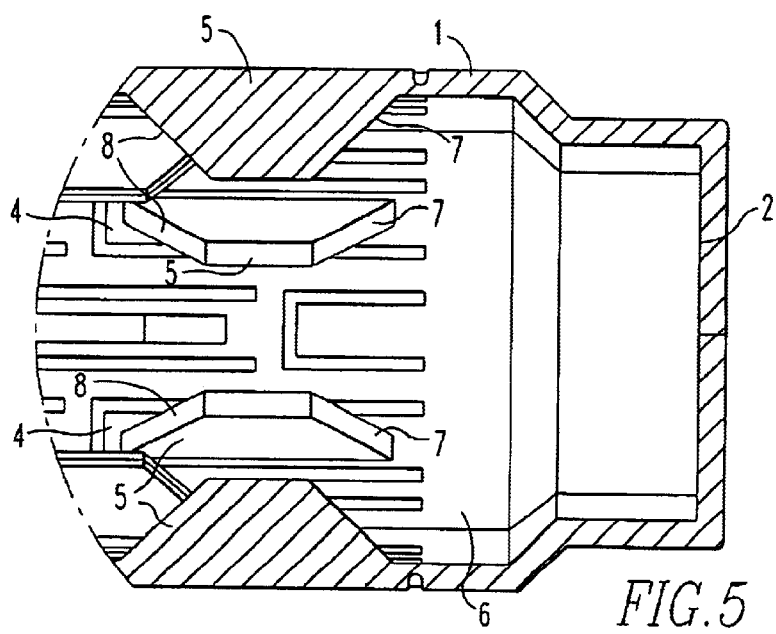
FIG. 5 is an enlarged representation of the area circled in FIG. 3 by the circle V.

FIGS. 1 to 5 show an injection anchoring sleeve according to the invention in various views. The anchoring sleeve consists of a sleeve body 1 with an essentially closed front end 2 and a radial flange 3 formed at the rear open end, which flange 3 forms a stop during insertion of the anchoring sleeve into an anchoring bore. The sleeve wall of the sleeve body 1 is provided with a number of flaps 4 distributed over the sleeve circumference and the length of the sleeve. The flaps 4 form radially outwardly bendable sleeve wall elements which are connected at their front ends, that is, their ends nearer the closed front 2 of the sleeve body 1, to the sleeve body 1, that is, they are integrally formed with the sleeve body. Otherwise, that is except for the front connection, the flaps are separated from the sleeve body. Accordingly, each flap forms a lid for an opening formed in the sleeve wall which opening is opened when the flap is pivoted outwardly about the pivot joint at the front end thereof by which it is connected to the sleeve body 1.

Furthermore, each flap 4 is provided at its inside with a rib 5 which projects radially inwardly into the interior 6 of the anchoring sleeve. The rib 5 is provided at its opposite longitudinal ends with inclinations 7 and 8 forming ramp areas.

The front ramp 7 is provided to permit sliding the anchoring sleeve out of a plastic injection molding tool which comprises a core defining the interior of the anchoring sleeve and having axial grooves corresponding to a negative form of the ribs 5 which are molded in the grooves. Upon sliding the anchoring sleeve off the core, the flaps 4 are pivoted outwardly about their front hinge portions to release the ribs 5 from the grooves in which the ribs 5 were molded.

As a result, the anchoring sleeve can be easily removed from the molding core.

Figure 6:
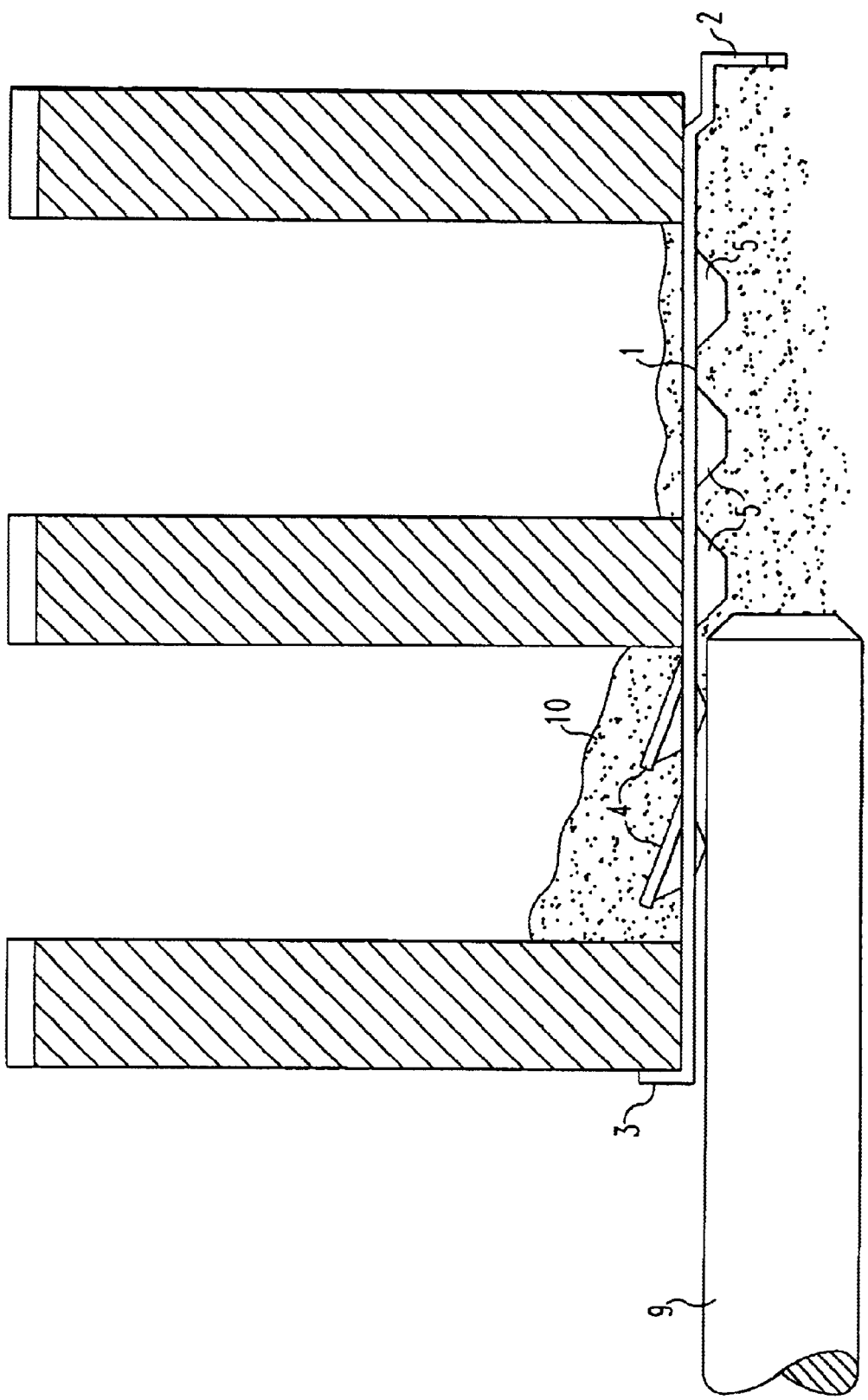
FIGS. 6–8 show, each in an axial semi-cross-sectional view, an anchoring sleeve inserted into an anchoring bore with the compression of the mortar in three different phases of the insertion procedure of the anchoring bolt.
Figure 7:
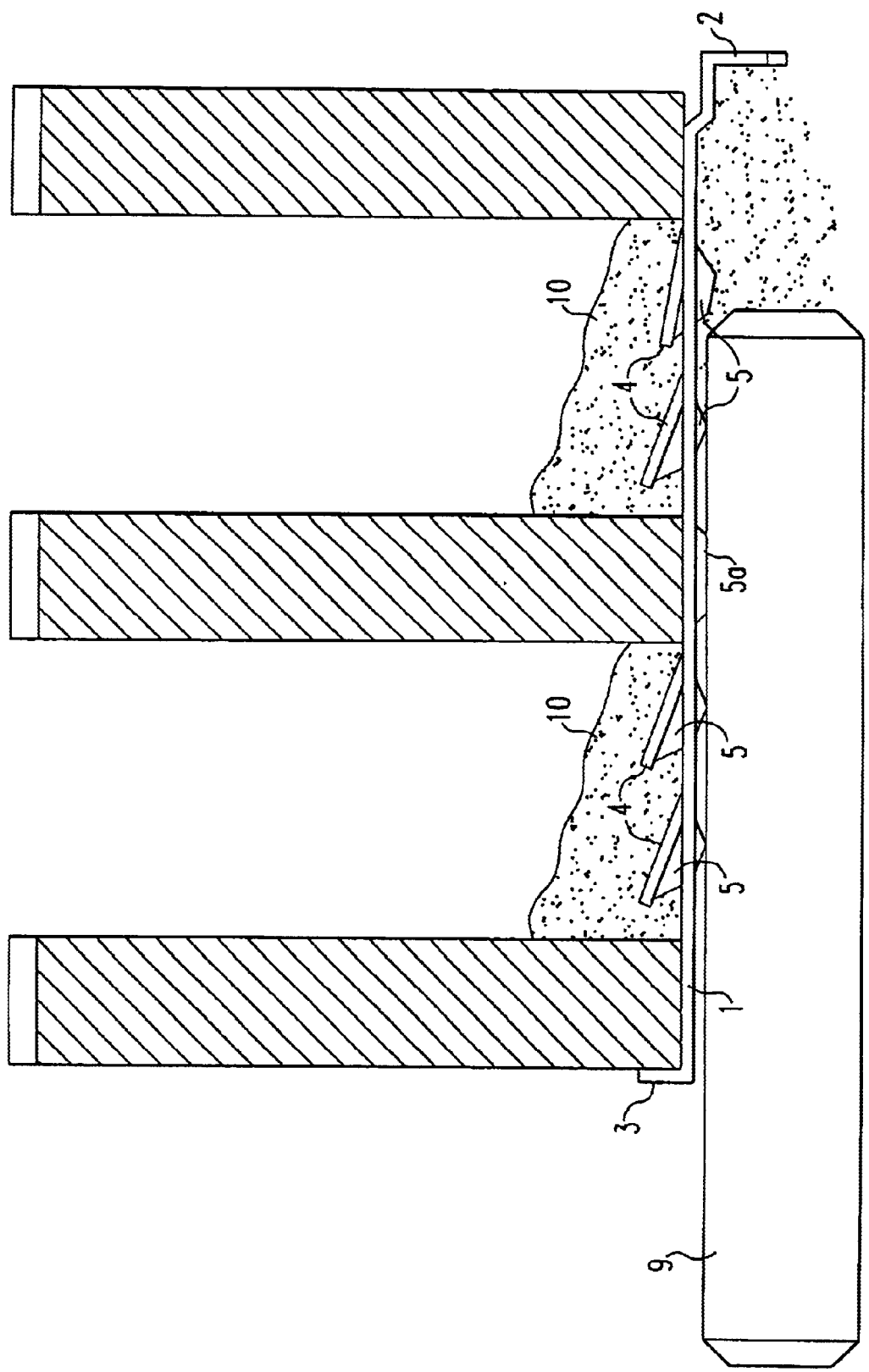
Figure 8:
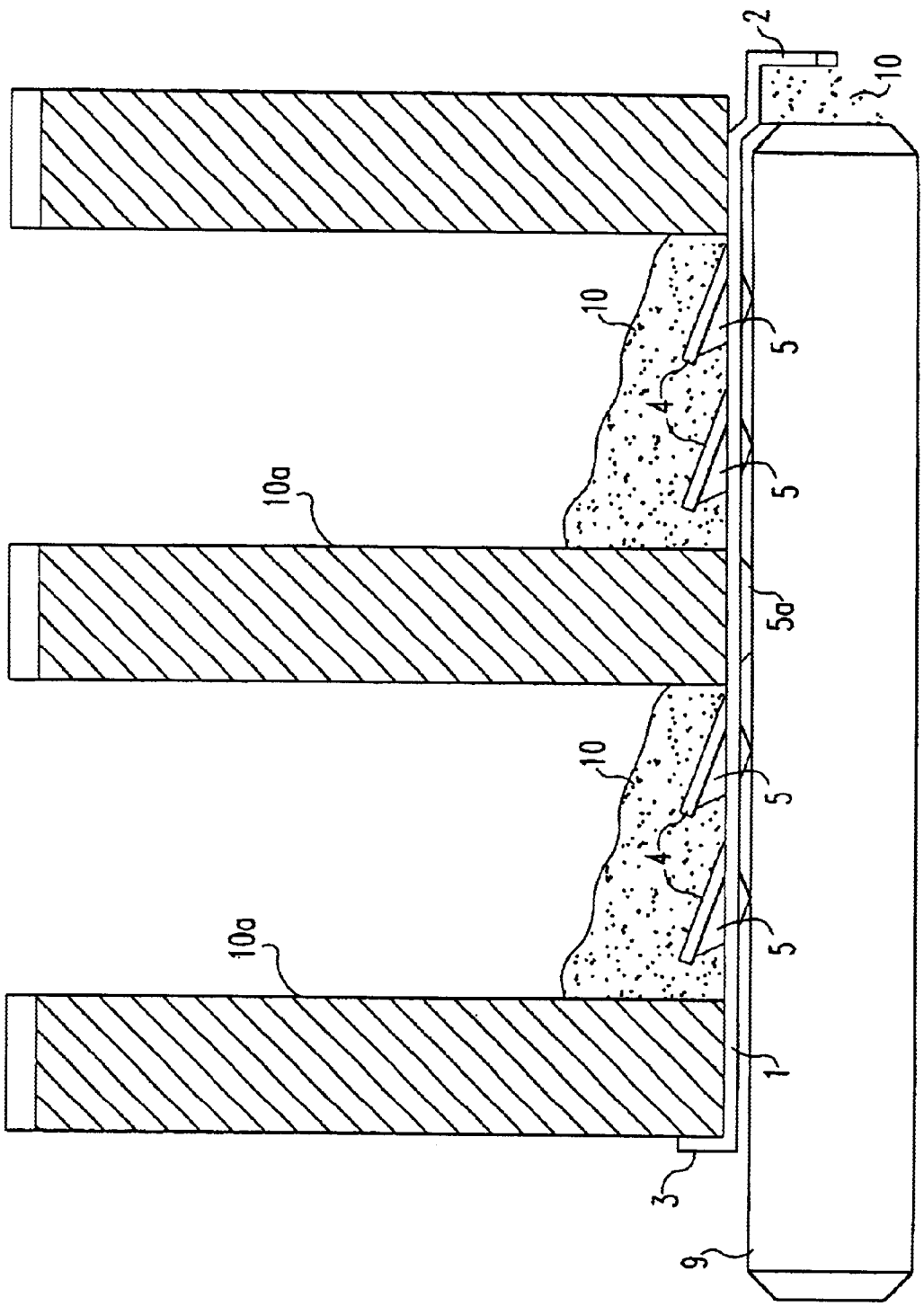

FIGS. 6 to 8 show an anchoring sleeve 1 inserted into an anchoring bore drilled into a hollow block wall having different chambers separated by the block walls. Mortar is injected into the anchoring sleeve 1. An anchor bolt 9 is then inserted into the anchoring sleeve 1. Upon insertion of the anchor bolt 9 into the anchoring sleeve 1, the flaps 4 are pivoted outwardly wherever the chambers in the hollow block permit such outward pivoting of the flaps 4 as the ribs 5 ride onto the anchor bolt 9. FIGS. 6 to 8 shows the bolt insertion procedures in three phases.

As far as the flaps 4 are not already pivoted outwardly after the insertion of the anchoring sleeve into the anchoring bore and after the injection of the injection mortar 10 into the anchoring sleeve 1 or if the flaps have been closed again after the injection of the mortar, the insertion of the anchor bolt into the anchoring sleeve causes the flaps to open again as the front end of the anchoring bolt 9 cooperates with the rear inclined area of the ribs 5 to bias the flaps 4 outwardly. After the insertion of the anchoring bolt 9, the flaps 4 remain in their outwardly projecting positions while the mortar hardens.

Where a flap 4 is prevented from being pivoted outwardly by coming into contact with a bore wall section, the respective rib 5 is compressed upon insertion of the anchor bolt 9 as shown in FIG. 8 at 5a. In this way, a radial clamping between the bore wall and the anchor bolt is achieved.

From the FIGS. 6–8, it is also apparent how the injection mortar 10 is guided by the opened flaps 4 into a position in which it provides for form-locking engagement with the walls 10a of the hollow block.

The invention is not limited to the particular embodiment shown. It is for example possible to provide, in place of the ribs 5, other inward projections on the flaps 4 which cooperate with the anchor bolt in the same manner.

In place of the ribs for example semispherical projections of sufficient height might be provided. These elements have the same effect as far as the outward pivoting of the flaps during removal of the mold core and during the introduction of the anchor bolt is concerned, but the ribs as described are considered to be more suitable as they provide for better guiding and a smaller resistance for the mortar flow out of the anchoring sleeve.

Furthermore, the flaps, which are arranged in adjacent rows, may be arranged circumferentially in a staggered arrangement.

What is claimed is:

1. A plastic injection anchoring sleeve comprising a sleeve body having an essentially cylindrical sleeve wall with an essentially closed front end and an open opposite end permitting the insertion of an anchoring bolt, said sleeve wall having a plurality of openings and flaps integrally formed with said sleeve wall and disposed in at least some of said openings, said flaps being pivotally supported at their front ends next to the closed end of said sleeve body by said sleeve wall via a pivot joint also integrally formed with said sleeve wall and said flaps, said flaps being provided at their inside each with an a rib projecting radially into said anchoring sleeve and extending parallel to the axis of said sleeve body, said rib having inclined front and rear and sections forming ramps for lifting said flaps out of said openings.

2. A plastic injection anchoring sleeve according to claim 1, wherein said openings of said sleeve wall provided with said flaps and said flaps are oblong in the direction of the axis of said sleeve body.

3. A plastic injection anchoring sleeve according to claim 2, wherein said sleeve body includes several rows of openings provided with flaps with ribs projecting inwardly from the inner surfaces of said flaps.

4. A plastic injection anchoring sleeve according to claim 3, wherein said openings with said flaps are arranged in circumferentially adjacent rows in an axially displaced manner.

* * * * *